United States Patent [19]

Stanley et al.

[11] Patent Number: 4,776,686

[45] Date of Patent: * Oct. 11, 1988

[54] SPECTACLES WITH EXTRACTABLE TEMPLES

[75] Inventors: Smith B. Stanley, Brooklyn; Yoram A. Alroy, New York, both of N.Y.

[73] Assignee: Alroy & Stanley Associates, Inc., Tampa, Fla.

[*] Notice: The portion of the term of this patent subsequent to Dec. 22, 2002 has been disclaimed.

[21] Appl. No.: 782,487

[22] Filed: Oct. 1, 1985

Related U.S. Application Data

[63] Continuation-in-part of Ser. No. 526,116, Aug. 24, 1983, Pat. No. 4,560,258.

[51] Int. Cl.$^4$ .......... G02C 5/20; G02C 5/14; G02C 5/22; G02C 11/02
[52] U.S. Cl. .......... 351/115; 351/120; 351/153; 351/51; 351/59
[58] Field of Search .......... 351/63, 119, 59, 115, 351/120, 121, 128, 153, 51, 52

[56] References Cited

U.S. PATENT DOCUMENTS

| 1,748,771 | 2/1930 | Howell .......... 351/115 |
| 1,926,649 | 9/1933 | Reinhold . |
| 2,032,139 | 2/1936 | Macy . |
| 2,322,393 | 6/1943 | Richardson et al. . |
| 2,323,518 | 7/1943 | Cochran .......... 351/63 |
| 2,714,448 | 8/1955 | Brown . |
| 2,824,308 | 2/1958 | Duncan . |
| 3,441,341 | 4/1969 | Dunn . |
| 3,689,136 | 9/1972 | Atamian . |
| 4,012,130 | 3/1977 | Guillet . |

FOREIGN PATENT DOCUMENTS

| 879623 | 3/1943 | France .......... 351/41 |

Primary Examiner—Rodney B. Bovernick
Attorney, Agent, or Firm—Herbert Dubno

[57] ABSTRACT

A pair of spectacles, preferably in the form of a card bearing advertising, decorative or promotional material, has a pair of channels formed in the frame and receiving respective temples which can be retracted and swung into a position in which they lie transverse to the frame to bring them into the position of use.

5 Claims, 6 Drawing Sheets

SPECTACLES WITH EXTRACTABLE TEMPLES

CROSS REFERENCE TO RELATED APPLICATION

This application is a continuation-in-part of our copending application Ser. No. 526,116 filed Aug. 24, 1983, now U.S. Pat. No. 4,560,258 issued Dec. 24, 1985.

FIELD OF THE INVENTION

Our present invention relates to spectacles with extractable temples and, more particularly, to eyeglasses, sunglasses, steroscopic-viewing glasses, polarized-lens glasses, eye-protective glasses, and the like, hereinafter referred to broadly as spectacles, composed of long-life or short-lived materials for repeated use or single-use applications for retention or disposal, and utilizing glass, or synthetic-resin (plastic) lenses, and which can be supplied or stored in a compact configuration whereby a temple is at least partly received in the bridgepiece between lenses or the frame structure overlying same.

In a particular aspect of the invention, the spectacles are provided in a flat-card from enabling legible matter to be placed thereon, e.g. as a novelty item.

BACKGROUND OF THE INVENTION

The usual pair of spectacles, as this term has been defined above, comprises a frame which may have a bridgepiece interconnecting a pair of window-forming portions which can be provided with respective lenses, with a respective temple being pivotally connected to each of these portions and formed with an earpiece.

When the spectacles are worn, the frame is supported on the nose of the wearer by the bridgepiece, the lenses are located in front of the eyes, and the temples extend rearwardly along the sides of the head and may engage, e.g. with the earpieces, behind the ears of the wearer.

Spectacles have been provided for a wide variety of purposes only some of which need be alluded to here. For example, they may be provided as ordinary eyeglasses with corrective lenses or lenses intended to assist in normal vision, either fabricated specially for the user or to provide magnification or some other special effect.

Sunglasses, for example, may be used as filters or attenuators to protect the eyes from the sun, while stereoscopic glasses may be used to provide three-dimensional illusions in viewing three-dimensional displays in which two distinct images are created by polarized light or color effects.

Colored-lens glasses may also be used simply as novelty items without sunlight filtering effects.

Spectacles may also be used to protect the eyes against vapors, the spattering of liquids and flying particulates.

For conventional frames, synthetic resin materials may be used or other materials such as wire and metals can be employed in whole or in part. Disposable or single-use spectacles, e.g. as sunglasses or for viewing three-dimensional motion pictures may be distributed widely at low cost and may utilize materials such as cardboard or paperboard.

In recent years a compact construction has been desired. In the standard mode of use, the temples of a pair of spectacles are permanently hinged at the outer ends of the frame to allow the temples to be swung inwardly and enable the folded pair of glasses to be inserted into a standard sleeve, into a pocket or otherwise stored. Sometimes a hinge or flexible connection is provided at the bridge piece to enable the spectacles to be folded into a somewhat more compact configuration.

While these systems have proved to be relatively compact, they invariably are somewhat bulky and it is desirable in some cases to provide an extremely flat construction.

We have attempted to ascertain earlier developments in this respect and in doing so have come across the following U.S. patents which may be material:

U.S. Pat. Nos. 1,926,649, 2,322,393, 2,714,448, 3,441,341, 2,032,139, 2,323,518, 2,824,308, 3,689,136.

Additional references may be found in the file of our prior application mentioned above.

OBJECTS OF THE INVENTION

It is the principal object of our present invention to provide an improved spectacle structure which has a flatter configuration than earlier spectacles but which nevertheless has greater versatility.

Still another object of the invention is to provide a simple, flat, compact spectacle construction avoiding disadvantages of prior art systems.

Yet a further object of our invention is to provide a readily printable novelty item which, at low cost, can be utilized to enable spectacle use.

It is also an object of our invention to provide an improved eyeglass structure which extends principles of our earlier application.

SUMMARY OF THE INVENTION

These objects and others which will become more readily apparent hereinafter are attained, in accordance with our invention, in which we provide a flattened spectacle frame provided with at least one longitudinal channel extending across the lens-receiving portion of the frame and through a bridgepiece thereof while opening at an end of the frame to enable a temple to be at least in part retracted from this channel and to be swung into a position of use in which this temple lies substantially transverse to the plane of the frame and the channel.

Generally the channel will accommodate two such temples, each of which can be extended from the channel in a respective direction generally linearly before the temple is swung into its use position.

This arrangement has the advantage that the temples are largely received within the frame while the latter retains its flat and preferable planar construction, without requiring folding of the temples or even telescoping of various sections of a temple into one another, systems which increase the complexity of manufacture and use. While the invention is applicable to the use of any materials, it can be carried out utilizing temples of plastics material, wire and other materials which are commonly utilized in spectacles. The invention especially enables paperboard or cardboard to be used as will be apparent below.

According to a feature of the invention, each temple is provided with an earpiece which may continue to project when the temple is otherwise received in the respective channel so that the earpiece can serve as a holder enabling the temple to be extended from the channel.

Alternatively, the earpiece may be partly received within the frame in a more compact construction.

The free end of the temple remote from the earpiece can be shaped, e.g. with a head of transverse formation, to prevent the shank of the temple from being fully extracted from the channel.

According to another aspect of the invention, the spectacles are formed as a card or sheet from which the frame can be separated, e.g. along perforations or scoring, with the temples likewise composed of a sheet material being then retracted from the frame to bend and fit around the head of the wearer.

This card can bear conventional indicia. For example, if it is to popularize some aspect of an event, e.g. the Olympic Games, the spectacles can be sunglasses provided with ultraviolet-absorbing or other light-absorbing lenses which may be light-polarizing filters, if desired, and the spectacles may bear some symbol of the Olympic Games or of some aspect thereof. This symbol can be exposed when the spectacles are worn. The other side of the card and, possibly other side of the spectacles, can bear other indicia, e.g. symbols for message, address and stamp, if the card is intended for use as a postal card. The card itself can be formed by folding a paperboard or cardboard sheet to define the channel receiving the temples. The temples and the card, including the openings over which the transparent acetate foils are fixed, can be formed by die stamping or cutting in a conventional manner.

According to a further feature of the invention, the temple may be folded within the channel. In this case, the temple may lie within a portion of the channel associated with that temple which may be continuous with the portions of the channel associated with the other folded temple or may be separated therefrom so that effectively two aligned but spaced-apart or separated channels may be provided to accommodate the temple.

According to yet another feature of the invention, pertaining to the embodiments in which the spectacles are die cut or embossed or perforated on a card which may be folded to define the channels, the temples may be perforated zones in one of the two layers which are brought together to form the structure. In this case score lines or perforations delineate the temples and earpieces and upon separation of them from the layer in which each temple is formed, each temple may be swung outwardly into the operating position.

The frame of the spectacle need not, of course, be a card and can be molded in one or more pieces from a synthetic resin material. Especially in the latter case, we have found it to be advantageous to provide two distinct and parallel channels to accommodate the respective temples which can be more or less rigid and can be provided with means in their inner ends to enable the swinging motion of each temple about a hinge point at the end of the respective channel. In this case, each channel may open only at a respective side of the frame and may be closed at the opposite side of the frame.

One of the channels may lie in front of the other or the channels may be provided one above the other.

Advantageously, in the embodiment in which the temples are rigid, an earpiece can be hingedly connected to the temple so as to be able to swing between a position in which the elongated earpiece lies substantially at a right angle to the respective temple into a position in which the earpiece includes an obtuse angle therewith.

In the first of these positions, the earpiece can lie close to the side of the frame for a compact construction of the spectacles when the temples are retracted in their respective channels while the second position corresponds to a position of use and is, of course, more comfortable for the user.

Detent means may be provided between the earpiece and the temple to index the earpiece relative to the temple in each of the two positions previously described or in additional positions of adjustment to accommodate the predelictions or requirements of the user.

Advantageously, the channels are formed by upper and lower frame members which are held together by a channel formed on a lens-carrying member which depends from the channel-forming structure and can be provided with any nosepiece engaging the bridge of the nose of the wearer.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
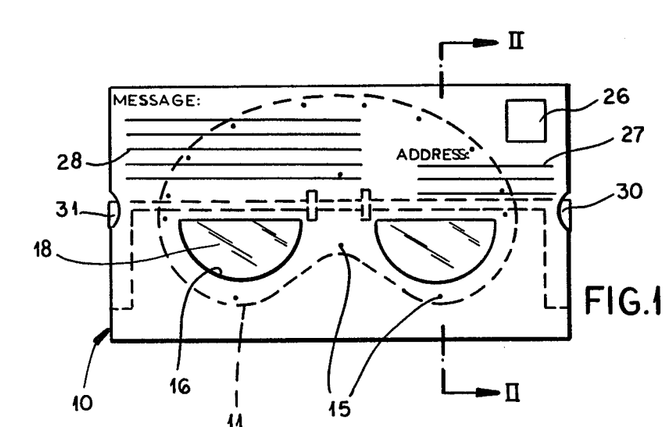
FIG. 1 is a plan view of a card from which spectacles according to the invention can be separated.

As can be seen from FIG. 1, a pair of spectacles may be defined in a card 10 by scoring 11 delineating a frame 12. The card 10 is formed by folding a sheet of paperboard, after die cutting thereof, so that a pair of layers 12 and 13 lie parallel to one another and extend codirectionally from a fold 14. The layers are held together by sealing points represented at 15 and are provided with windows 16 and 17, each of which is closed internally by a panel 18 of colored transparent acetate foil to form a sunglasses lens.

The folded over sheet defines a channel 19 in which a pair of temples 20, 21 can be disposed one behind the other, each of these temples being formed with an enlarged head 22, 23 which is prevented from being fully extracted from the channel by a pair of sealing points 24, 25 at the respective side of the frame 12.

The exposed surface of the card 10 seen in FIG. 1 (and the exposed surfaces of the cards of FIGS. 8–11) can be provided with indicia, such as a printed field 26 for a postage stamp, a printed field 27 for an address, and a printed field 28 for an appropriate message. When the card is used as a postcard, the recipient can simply separate the spectacles from the remainder of the card along the score lines or perforations 11 and utilize the spectacles for the intended purpose, i.e. for sunglasses in the case illustrated.

Naturally, instead of the printed indicia represented in FIG. 1, the card can be provided with advertising messages or the like.

The reverse field of the card can also bear indicia, e.g. as presented at 29 which can serve as a symbolic representation of an event, a place or some remainder which can remain on the frame 15 of the sunglasses and can be displayed, e.g. as an advertising message carried by the wearer or merely for decorative purposes. This, of course, applies to the embodiments of FIGS. 8–11 as well.

The temples 20, 21 can be provided with earpieces 30, 31 which may be lodged between the leaves of the folded product as shown in FIG. 1.

Figure 3:
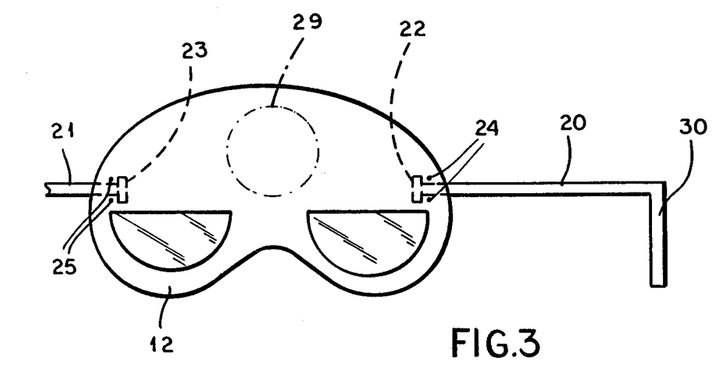
FIG. 3 is a view of the opposite side of the spectacles after they have been separated from the card.
Figure 4:
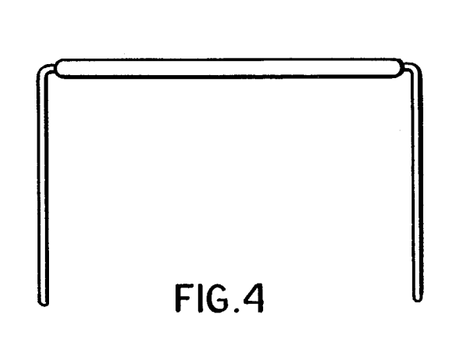
FIG. 4 is a top view of the spectacles showing the bending of the temples after they have been extracted from the channel.

When the spectacles have been separated from the rest of the card (FIG. 3), the temples can be drawn out into the position shown and then bent rearwardly at FIG. 4 to the normal position of such temples embracing the head of the user.

Figure 5:
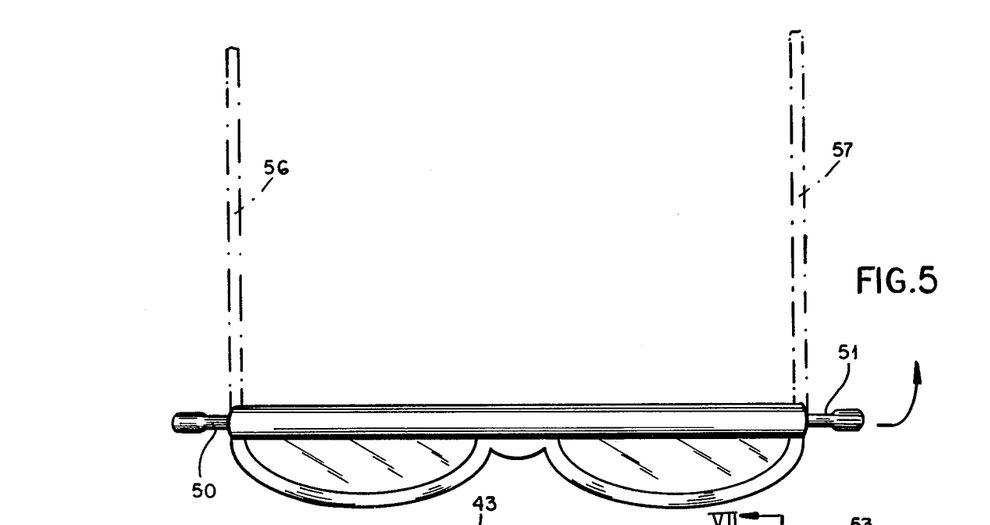
FIG. 5 is a top view of another pair of spectacles utilizing the principles of the invention and showing the temples retracted in solid lines, but extended in a dot-dash view.
Figure 6:
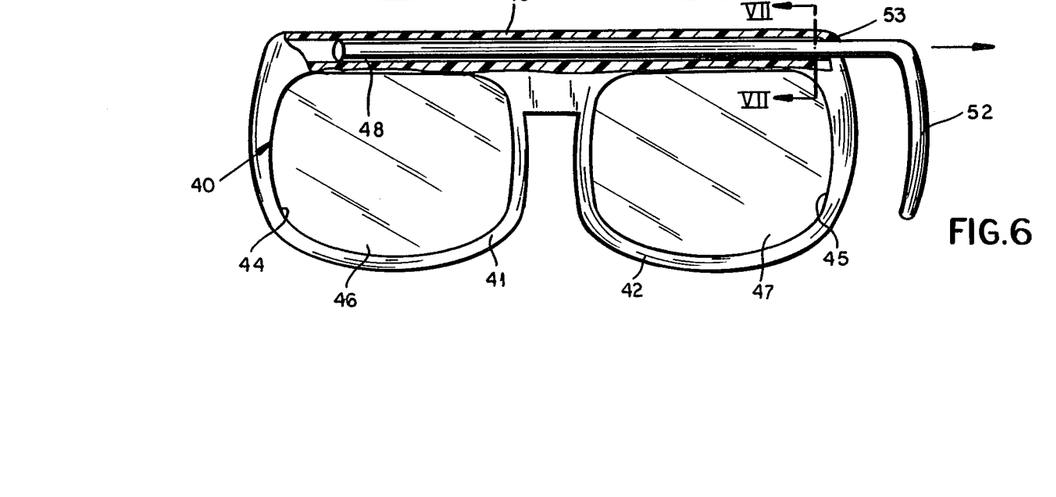
FIG. 6 is a front-elevational view, partly broken away of the spectacles.
Figure 7:
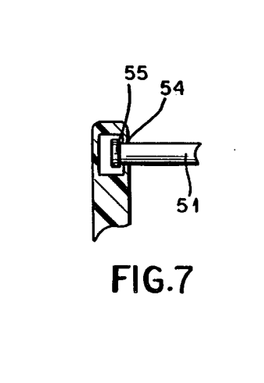
FIG. 7 is a detail view in section along the line VII—VII of FIG. 6.

In FIGS. 5–7, we have shown another embodiment in which the generally flat character of the spectacles is retained.

In this embodiment, the frame 40 can comprise a pair of lens-receiving portions 41 and 42 interconnected by a bridgepiece 43, molded rigid therewith. The portions 41 and 42 are provided with windows 44, 45 each of which receives a lens 46, 47. In this embodiment, a channel 48 is provided in the linear rigid member formed by the upper parts of members 41 and 42 and by the bridgepiece 43. While a common channel is utilized to receive the two temples 50 and 51 (only one of which is shown in FIGS. 6 and 7), it will be understood that separate channels can also be employed, if desired (see FIGS. 13-19). Each of the temples 50, 51, is formed with an earpiece 52 and projects through a passage 53 at the respective end of the frame so that the temple can be retraced through this passage and swung into a rearwardly open slot 54 (FIG. 7), the retraction being limited by an enlarged head 55 at the end of the temple.

Figure 2:
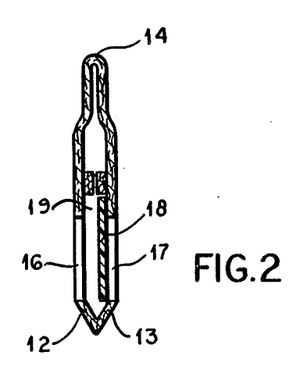
FIG. 2 is a cross sectional view generally taken along the line II—II of FIG. 1.
Figure 2A:
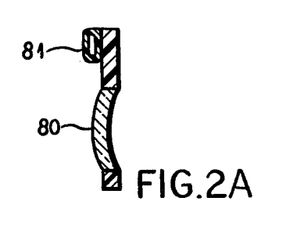
FIG. 2A is a cross section through another embodiment.

Thus in the retracted position shown in FIGS. 5 and 6 in solid lines, the temples are practically completely received within the channel and only the earpieces 52 remain exposed and are coplanar substantially with the balance of the frame. When, however, the temples are retracted, they can be swung into the normal use position shown in dot-dash lines at 56 and 57 to engage the head of the wearer. It is also possible in both of the embodiments described to form the channels from a tubular member 81 (FIG. 2A) which can be applied to the frame element 80, e.g. by heat sealing, adhesive bonding or orther conventional means.

Figure 8:
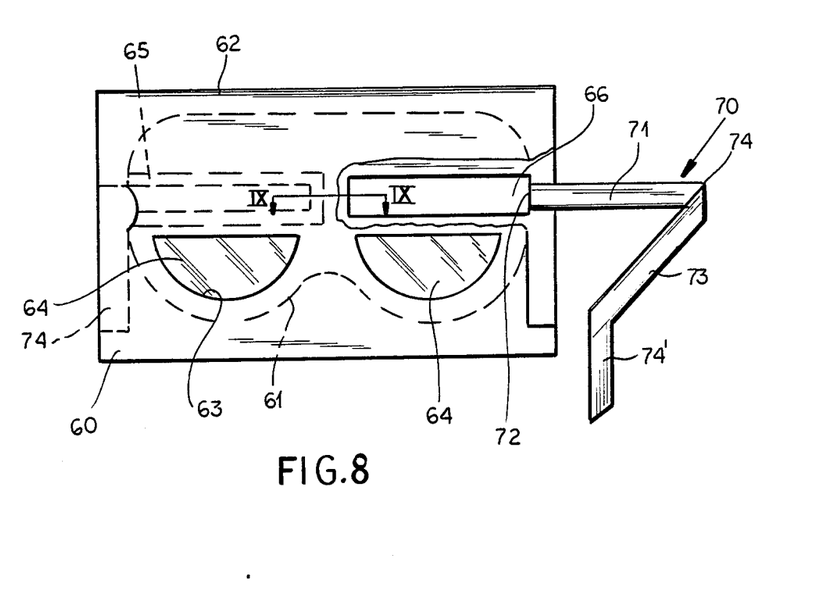
FIG. 8 is a plan view of a card according to another embodiment of the invention wherein the channel is interrupted and each of the temples is folded, the card being partly broken away with one of the temples being folded out.

Referring now to FIG. 8, it can be seen that a cord 60 is provided with perforations 61 to define a spectacle frame and fabricated from two layers of card stock folded together along an edge 62 and cemented together; the card can have windows 63 as previously described to accommodate the lenses 64.

Unlike the embodiment of FIG. 1, where a single channel extends the full length of the frame to receive both temples, in this embodiment a pair of aligned channels 65, 66 is provided by embossing and the channels are separated by a region 67 in which the two layers 68 and 69 of the card are bonded together by an adhesive.

Each of the temples 70 thus comprises a portion 71 which is hinged at 72 to the card adjacent one side of the latter along which the temple is to be provided.

This section 71 is connected by a fold 74 to a section 73 having an earpiece 74.

Figure 9:
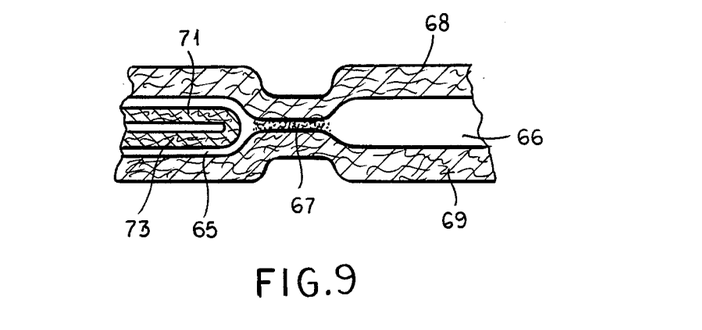
FIG. 9 is a section taken along the line IX—IX of the gate.

The two sections 71 and 73 lie folded within the channel as can be seen from the left-hand side of FIG. 9 before the temples are extracted. To extract the temples, the earpiece 74 is separated from the respective layer along the perforation line 76 to allow the folded temple to be extracted (right-hand side of the gate) and engaged around the ear of the user.

Figure 10:
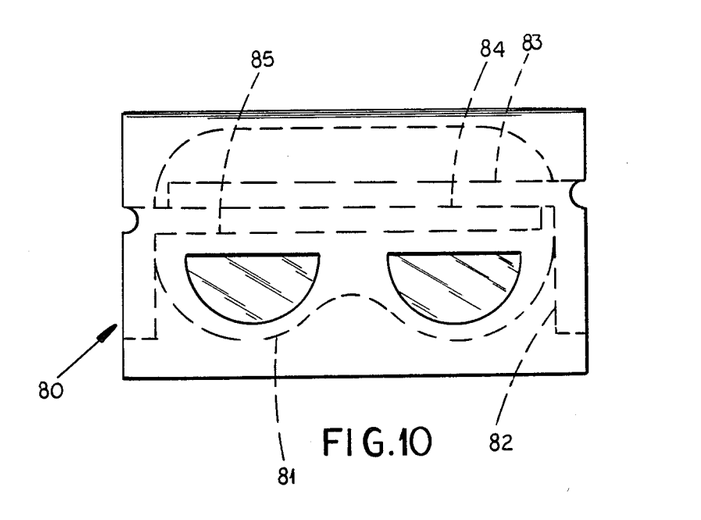
FIG. 10 is a view similar to FIG. 1 illustrating still another embodiment of a perforated-card construction.
Figure 11:
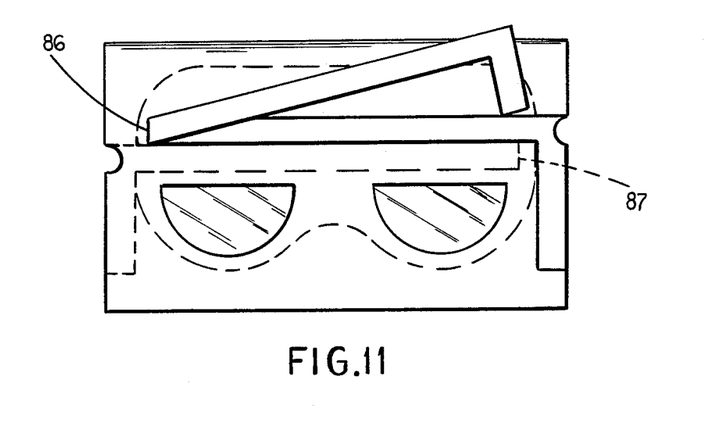
FIG. 11 is another plan view showing one of the temples of the latter embodiment being swung out of the plane of the card layer from which it has been partly separated.

FIG. 10, by contrast, provides a card 80 with perforations 81 to delineate the spectacle frame. Here, however, additional perforation lines 82, 83, 84 and 85 delineate the respective temples and earpieces so that each temple may be separated from the respective layer of the card (see FIG. 11) and folded open about respective fold lines 86 and 87 to present the spectacles in an open position. The perforation 84 is, of course, a shared perforation for the two temples.

Figure 12:
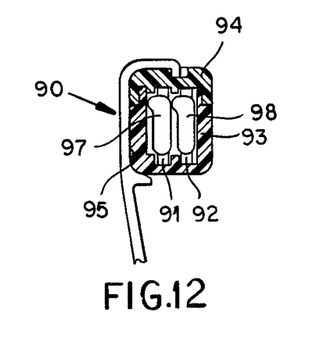
FIG. 12 is a section through a rigid-frame embodiment of the invention having two channels for respective rigid temples lying in a front-to-back relationship according to the invention.
Figure 13:
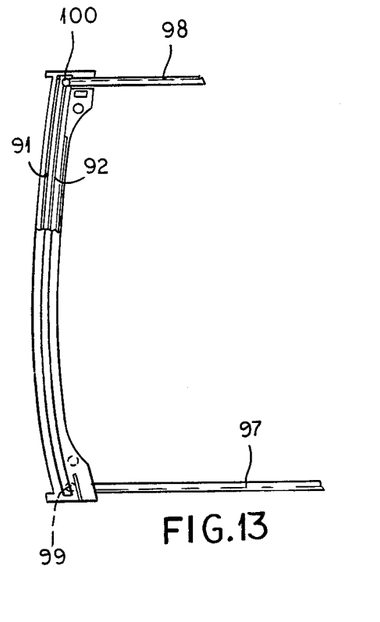
FIG. 13 is a top view with part of the cover broken away to show the two channels.

In FIGS. 5 through 7, we have shown a rigid frame construction utilizing similar principles and these principles have been extended in the embodiment of FIGS. 12 and 13 to a frame 90 in which a pair of channels 91 and 92 in a front-and-back relationship are provided in a rigid bar extending above both lenses and across the bridge of the spectacles. This bar is constituted by a base 93 and a cover 94, each of which can be injection molded from synthetic resin material and which, when interfitted as shown in FIG. 12, define the two channels. The two members 93 and 94 may be held together by a channel-shaped portion 95 of the lens-forming member 96. As can be seen from FIGS. 12 and 13, each of the channels 91 and 92 receives a respective temple 97, 98, the temples being shown in their swung-out positions in FIG. 13 where the two channels 91 and 92 are also visible. Hinge formations are provided at 99 and 100 for the temples to enable them, when they each reach the end of the respective channels, to be swung outwardly into the position shown in FIG. 13.

Figure 14:
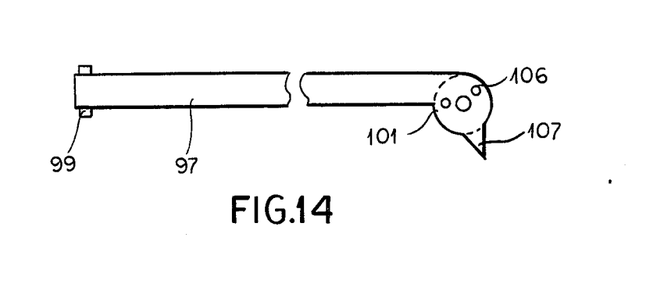
FIG. 14 is a side view of one of the temples showing part of the indexing means thereof.
Figure 15:
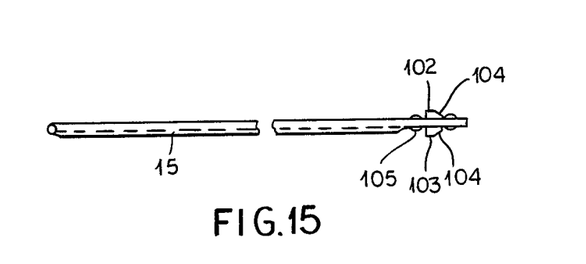
FIG. 15 is a top view of this temple.

The temples are each provided with earpieces as has been shown for the temple 97 in FIGS. 14 and 15. More particularly, each temple is formed at its free end with a hollow circular lug 101 with a pair of pins 102, 103 projecting in opposite directions so as to form a pintle for the earpiece which can be slipped over the lug. The pintle has ramps 104 which facilitate spreading of the bifocated end of the earpiece to ensure that it will snap over a pivot upon the pintle.

A pair of bumps 105, 106 is provided on each lug to form a detent means for the earpiece and a stop in the form of a projection 107 is likewise provided on this lug.

Figures 16, 17:
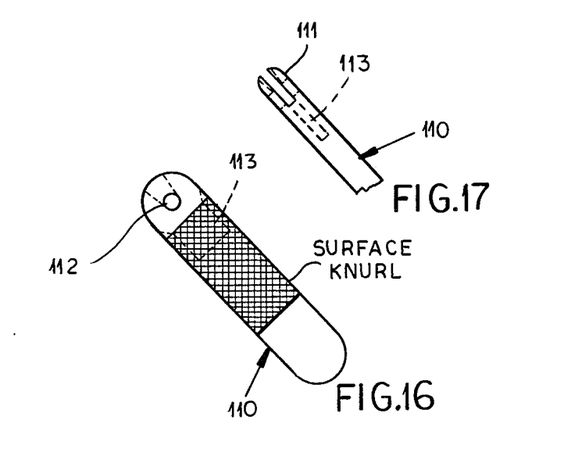
FIG. 16 is a side view of the earpiece adapted to cooperate with this temple.
FIG. 17 is a top view of a portion of this earpiece.

The earpiece is best seen in FIGS. 16 and 17 and has been represented at 110. It has a bifurcated end 111 which is adapted to snap over the pintle and has bore 112 into which the pintle fits to allow a limited pivoting movement of the earpiece on the temple. A cavity 113 in the pintle accomodates the projection 107.

Figure 19:
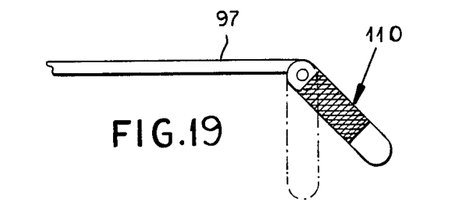
FIG. 19 is an elevational view with the earpiece in place showing an alternative position in dot-dash lines.

The earpiece 110 (FIG. 19) can thus be indexed in either of the two positions shown, i.e. in the dot-dash position in which the earpiece is substantially at a right angle to the temple so that it will lie close to the side of the frame and provide a compact configuration when the temple is fully inserted in its channels, and in the solid-line position in which the earpiece may be rotated for use. Other detent means or ratchet configurations may be provided to allow for additional positions which comfort so warrants.

Figure 18:
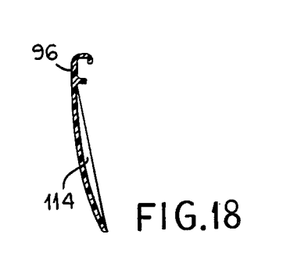
FIG. 18 is a section through the lens-forming member.

FIG. 18 shows the lens member 96 in greater detail, the lens being seen at 114.

We claim:

1. A pair of spectacles comprising:

a rigid member carrying a lens element and formed with a pair of channels overlying a pair of lenses forming said element; and respective temples received in said channels and extendable therefrom at opposite ends of said member and swingable relative to said member upon extension from said channels to lie along opposite sides of the head of a user, each of said temples having an elongate shank of a length sufficient to enable each temple to overlie both of said lenses to be received substantially completely in a respective one of said channels and to be extracted from the respective channels for fitting of the spectacles on the head of the user, each of said shanks having an earpiece at one end thereof and means forming a hinge with said rigid member at an opposite end of the respective shank when the respective shank is extracted from the respective channel.

2. A pair of spectacles defined in claim 1 wherein said member is formed from two interfitting parts defining said channels between them.

3. The pair of spectacles defined in claim 2 wherein said element has a channel-shaped structure receiving said interfitting parts and holding them together.

4. The pair of spectacles defined in claim 7, further comprising means for swingably mounting said earpieces on each of said shanks.

5. The pair of spectacles defined in claim 4, further comprising indexing means for indexing said earpieces in a plurality of relative angular positions with reference to the respective shanks.

* * * * *